United States Patent
Liu et al.

(10) Patent No.: US 11,360,745 B2
(45) Date of Patent: Jun. 14, 2022

(54) CODE GENERATION FOR LOG-BASED MASHUPS

(71) Applicant: FUJITSU LIMITED, Kawasaki (JP)

(72) Inventors: Lei Liu, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 16/836,867

(22) Filed: Mar. 31, 2020

(65) Prior Publication Data

US 2021/0303270 A1    Sep. 30, 2021

(51) Int. Cl.
   *G06F 8/30*    (2018.01)

(52) U.S. Cl.
   CPC .................................... *G06F 8/30* (2013.01)

(58) Field of Classification Search
   None
   See application file for complete search history.

(56) References Cited

U.S. PATENT DOCUMENTS

| | | | |
|---|---|---|---|
| 9,069,873 B2 | 6/2015 | Kim | |
| 10,191,786 B2 | 1/2019 | Liu | |
| 10,430,255 B2 | 10/2019 | Liu | |
| 10,691,507 B2 | 6/2020 | Bahrami | |
| 11,017,002 B2 | 5/2021 | Liu | |
| 2011/0153590 A1* | 6/2011 | Chang | G06F 16/958 707/711 |
| 2017/0277756 A1* | 9/2017 | Masuda | G06F 9/5072 |
| 2018/0232444 A1 | 8/2018 | Duesterwald | |
| 2019/0384856 A1* | 12/2019 | Liu | G06F 40/284 |
| 2021/0173633 A1* | 6/2021 | Criscuolo | G06F 8/656 |

OTHER PUBLICATIONS

Boris Tapia, "Recommending APIs for mashup completion using association rules mined from real usage data", 2012, IEEE (Year: 2012).*
"Welcome to API Harmony!", date unknown, API Harmony (Year: 2021).*
David Behind, "Facebook staged rollout for Instagram messaging capabilities", Aug. 2021, programmable web (Year: 2021).*

(Continued)

*Primary Examiner* — Lewis A Bullock, Jr.
*Assistant Examiner* — Mark A Gooray
(74) *Attorney, Agent, or Firm* — Fujitsu Patent Center

(57) ABSTRACT

According to an aspect of an embodiment, operations include receiving first log data including first information associated with electronic trigger events from a trigger data source. The operations further include extracting trigger output parameters from a first sentence token of the received first log data and displaying a first set of trigger rules onto an electronic User Interface (UI) of a user device based on the extracted trigger output parameters. The operations further include receiving a first input comprising a selection of one or more trigger rules of the displayed first set of trigger rules and receiving a second input comprising a selection of computer-executable actions to be performed based on whether the first information satisfies the one or more trigger rules. The operations further include generating a computer-executable mashup code for execution on a runtime system based on the received first input and the received second input.

16 Claims, 9 Drawing Sheets

(56) References Cited

OTHER PUBLICATIONS

Gao, W., Chen, L., Wu, J. and Gao, H., Jun. 2015. Manifold-learning based API Recommendation for Mashup Creation. In 2015 ieee international conference on web services (pp. 432-439). IEEE.
Xue, Q., Liu, L., Chen, W., & Chuah, M. C. (Dec. 2017). Automatic Generation and Recommendation for API Mashups. In 2017 16th IEEE International Conference on Machine Learning and Applications (ICMLA) (pp. 119-124). IEEE.
Glassman, E. L., Zhang, T., Hartmann, B., & Kim, M. (Apr. 2018). Visualizing api usage examples at scale. In Proceedings of the 2018 CHI Conference on Human Factors in Computing Systems (pp. 1-12).

* cited by examiner

CODE GENERATION FOR LOG-BASED MASHUPS

FIELD

The embodiments discussed in the present disclosure are related to code generation for log-based mashups.

BACKGROUND

Many companies and organizations offer mashup platforms to develop API mashups from a number of web APIs for several applications, such as speech processing and social media analysis. Typically, an API mashup combines the functionality of several APIs into a new service and includes a trigger, a rule, and an action to be performed if the trigger satisfies the rule. API-based mashups are used in all kinds of businesses and are generally used by companies to integrate various software into their products efficiently and inexpensively. All the API mashups in the market typically require a call to an API endpoint to generate a trigger, which may limit the applicability of such API mashups to applications where there are APIs available to generate triggers.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving first log data including first information associated with one or more electronic trigger events from a trigger data source. The operations may further include extracting one or more trigger output parameters from a first sentence token of the received first log data and displaying a first set of trigger rules as a first set of user-selectable options onto an electronic User Interface (UI) of a user device based on the extracted one or more trigger output parameters. The operations may further include receiving a first input, which may include a selection of one or more trigger rules of the displayed first set of trigger rules. The operations may further include receiving a second input which may include a selection of one or more computer-executable actions to be performed based on whether the first information associated with the one or more electronic trigger events satisfies the one or more trigger rules. The operations may further include generating a computer-executable mashup code for execution on a runtime system based on the received first input and the received second input.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in the present disclosure relate to a method and a non-transitory computer-readable medium for automatic code generation for log-based mashups. The present disclosure relates to the generation of a workflow code for a log-based mashup, without a need for a developer to manually code various sections (trigger, rule, action) of the log-based mashup. Typically, conventional methods rely on a developer to generate workflow codes, which when executed, can listen to event triggers, apply trigger rules on trigger output data, and performs actions based on whether trigger output data satisfies the trigger rules. The developer may need to explicitly code the event triggers, trigger rules, and actions and then may have to test individual section of the generated workflow code for debugging errors. This strategy often takes a longer development life cycle usually with a higher development cost in terms of resources.

Although there are several companies which provide mashup platforms, the mashup recipes included in these platforms are typically associated with API mashups. All the API mashups in the market typically require a call to an API endpoint to generate a trigger, which may limit the applicability of such API mashups to applications where there are APIs available to generate triggers. There are data sources, such as data logs, which may not be exposed through API endpoints and therefore, it may not be possible to use such data sources to generate triggers for executable mashups.

According to one or more embodiments of the present disclosure, the technological field of software development may be improved by configuring a system to generate a workflow code for a log-based mashup, without a need for a developer to manually code individual sections of the log-based mashup. The executable codes, including triggers, rules and actions, may be generated to achieve end-to-end log-based mashups. Compared with existing API mashup platforms that rely on experienced human developers to design codes for each new API triggers and actions, the mashup recipes of the present disclosure are generated by a machine (with limited human-in-the-loop), which allows for achievement of a shorter development cycle (developer time may be consumed mostly during testing/validation) and lower development cost. These mashup recipes don't require an API endpoint to generate a trigger, but instead require a log file path or a queuing system which publishes log data at regular intervals. The present disclosure may also incur low development cost during the generation of workflow code for log-based mashup and also for the future integrations of API's as actions in the log-based mashup. Therefore, the present disclosure may save developer efforts and time that was previously required in generation of workflow code.

Embodiments of the present disclosure are explained with reference to the accompanying drawings.

Figure 1:
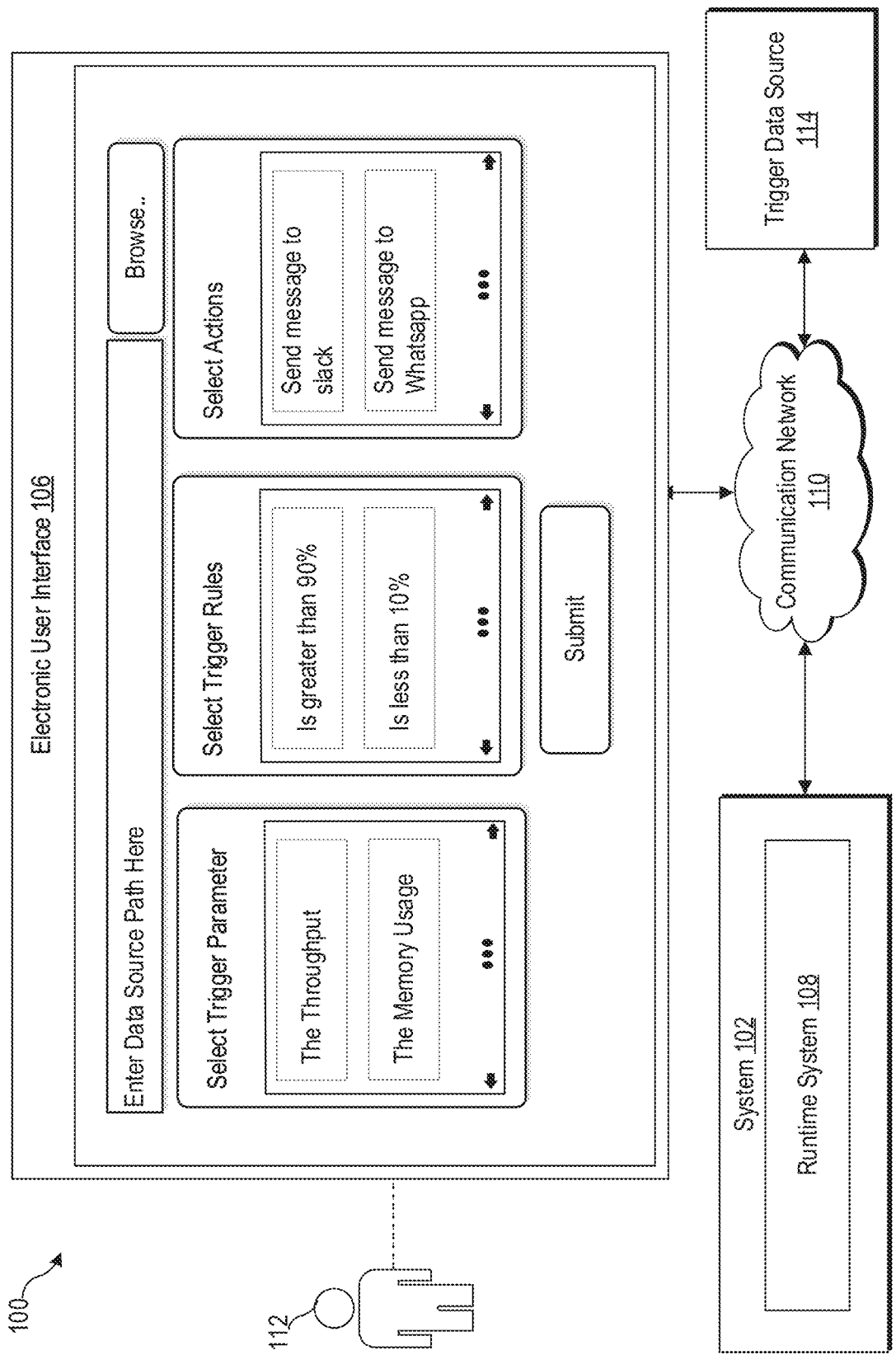
FIG. 1 is a diagram representing an example environment related to code generation for log-based mashups.

FIG. 1 is a diagram representing an example environment related to code generation for log-based mashups, arranged in accordance with at least one embodiment described in the present disclosure. With reference to FIG. 1, there is shown an example environment 100. In the example environment 100, there is shown a system 102 and a user device 104. There is further shown an electronic user interface (UI) 106 rendered on the user device 104, a runtime system 108, and a communication network 110. In some embodiments, the runtime system 108 may be a part of the system 102. The system 102 and the user device 104 may be communicatively coupled to each other, via the communication network 110. There is further shown a user 112 who may be associated with the user device 104. Examples of the user device 104 may include, but are not limited to, a mobile device, a desktop computer, a laptop, a computer workstation, a server, such as a cloud server, and a group of servers. In one or more embodiments, the user device 104 may include a user-end terminal device and a server communicatively coupled to the user-end terminal device. Examples of the user-end terminal device may include, but are not limited to, a mobile device, a desktop computer, a laptop, and a computer workstation.

The system 102 may include suitable logic, circuitry, and interfaces that may be configured to display the electronic UI 106 on the user device 104 and a set of user-selectable options onto the displayed electronic UI 106 of the user device 104. Such options may correspond to one or more triggers options, trigger rules, and computer-executable actions for a log-based mashup. The system 102 may receive first log data from a trigger data source 114. The trigger data source 114 may store and/or curate a set of log data associated with a log-based application. As one example, the trigger data source 114 may be an edge node of a telecom facility and may store logs, such as a network status log or a network diagnostics log, associated with operations of the telecom facility. As another example, the trigger data source 114 may be a sensor device in a home network of various sensor devices and may collect and store sensor data in logs. Other examples of the trigger data source 114 may include, but are not limited to, one or more node devices in a wireless sensor network (WSN), a database system, an event-streaming server, a complex event processing (CEP) server, a cloud-based log store, a web server, node devices of a communication network, edge devices, consumer-electronic devices (such as smartphones, tablets, cameras, or wearable electronics), white good appliances, workstations, servers/edge device in datacenters, networking devices (such as routers, switches, bridges, and gateways), or any electronic device with a capability to collect data and generate data logs of the collected data.

In one or more embodiments, the system 102 may receive, via the displayed electronic UI 106, a trigger data source path associated with the trigger data source 114. For example, the trigger data source path may be one of an absolute or a relative path with a slash-separated list of directory names followed by either a directory name or a file name, a uniform resource locator (URL) of the trigger data source 114, or a Unified Naming Convention (UNC) path. Based on the received trigger data source path, the system 102 may select the trigger data source 114. In these or other embodiments, the system 102 may implement a trigger watcher function to monitor the trigger data source path to determine if the first log data with new records is available at the trigger data source 114. The first log data with the new records may be retrieved and a timestamp may be appended to the first log data.

The first log data may include first information associated with one or more electronic trigger events. For example, if the first log is a network log of a software application on the user device 104, the first information in the network log may include record of events that occurred in the application, such as records of access calls to objects, attempts at authentication, and other activities associated with the application. In this example, an electronic trigger event may be specified as detection of an authentication attempt of the user 112 through an application interface of the software application. Each electronic trigger event may be associated with event data (as part of the first information in the first log data) which may be used to detect the electronic trigger event. In this example, the event data may include records of authentication attempts with a timestamp and a result of such attempts.

The system 102 may extract one or more trigger output parameters from a first sentence token of the received first log data. The one or more trigger output parameters may be extracted by application of natural language processing (NLP) operations on the received first log data. For example, if the first log data is obtained from a networking device log file which contains a sentence with both word tokens and numerical values as "13:46:00: [WARNING] The throughput is 30 Mbps, using a policy limitation of 90%.", then trigger output parameters may be extracted as "the throughput" and "policy limitation". With automatic extraction of the trigger output parameters, it may be helpful for developers to design computer-executable log-based mashups without a need for manually opening and reading log files to identify such parameters as the trigger out parameters.

The system 102 may further display a first set of trigger rules as a first set of user-selectable options onto the electronic UI 106 of the user device 104. The first set of trigger rules may be displayed based on the extracted one or more trigger output parameters. Additionally, or alternatively, the first set of trigger rules may be displayed based on one or more general attributes associated with the first log data. For example, such attributes may include the trigger data source path, the name of a log file which contains the first log data, or a new line in the first log data. Each trigger rule may correspond to a combination of a trigger output parameter, a trigger criterion, and a trigger value to be used as a value of the trigger output parameter.

The system 102 may receive a first input from the user 112 via the user device 104. The first input may correspond to a selection of one or more trigger rules from the displayed first set of trigger rules. These trigger rules may have to be applied on the first information in the received first log data to determine whether a new value of a trigger output parameter in the first log data satisfies the trigger criteria and the trigger value of the trigger output parameter. Specifically, the trigger value may have to be compared with the new value in the first information of the first log data based on the trigger criteria in the trigger rule. For example, the first input may correspond to selection of a trigger rule with a trigger output parameter as "the throughput", the trigger criteria as "greater than", and the trigger value as "20

Mbps". The first input may correspond to a single trigger rule or multiple trigger rules. In case of multiple trigger rules, results of multiple trigger rules may be combined based on a logical operator (such as OR/AND), which may be specified via the first input.

The system 102 may further receive a second input from the user 112 via the user device 104. The second input may correspond to selection of one or more computer-executable actions to be performed based on whether the first information associated with the one or more electronic trigger events satisfies the one or more trigger rules. Example of a computer-executable action may include, but are not limited to, an API call to a corresponding API endpoint, a microservice call, a Remote Procedural Call (RPC), or a call to invoke processes running on disparate operating systems using protocols, such as Simple Object Access Protocol (SOAP). By way of example, and not limitation, the first information in the first log data may include a new line as "13:46:00: [WARNING] The throughput is 30 Mbps, using a policy limitation of 90%.". If the trigger rule includes a trigger output parameter as "the throughput", the trigger criteria as "greater than", and the trigger value as "20 Mbps", then the new value of the throughput of 30 Mbps may be determined to be greater than the trigger value of 20 Mbps. Thereafter, a trigger response (e.g., 1) may be generated to indicate that the trigger rule is satisfied. Based on such trigger response, a computer-executable action may be performed by executing an API call to send a message to Slack® or send a message to WhatsApp®. In case the one or more trigger rules are not satisfied, the one or more computer-executable actions may not be performed. For example, no message may be sent on Slack® or WhatsApp® if the throughput is less than 20 Mbps (which is the trigger value specified in the trigger rule).

The system 102 may generate a mashup code based the received first input and the received second input. The mashup code may be configured to be computer-executable on the runtime system 108 and may include one or more computer-executable trigger codes, one or more computer-executable rule codes associated with the one or more trigger rules, and one or more computer-executable action codes associated with the one or more computer-executable actions. Herein, the runtime system 108 may be referred to as a collection of managed hardware and software resources which are typically required for program execution.

It should be noted here that the communication between the system 102 and the user device 104 may be performed via the communication network 110. The communication network 110 may include a communication medium through which the system 102 may communicate with the user device 104 and/or different devices (not shown). Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the system 102 without departing from the scope of the present disclosure. For example, the system 102 may be a distributed network of servers which may collectively automatically generate code for the log-based mashup.

Figure 2:
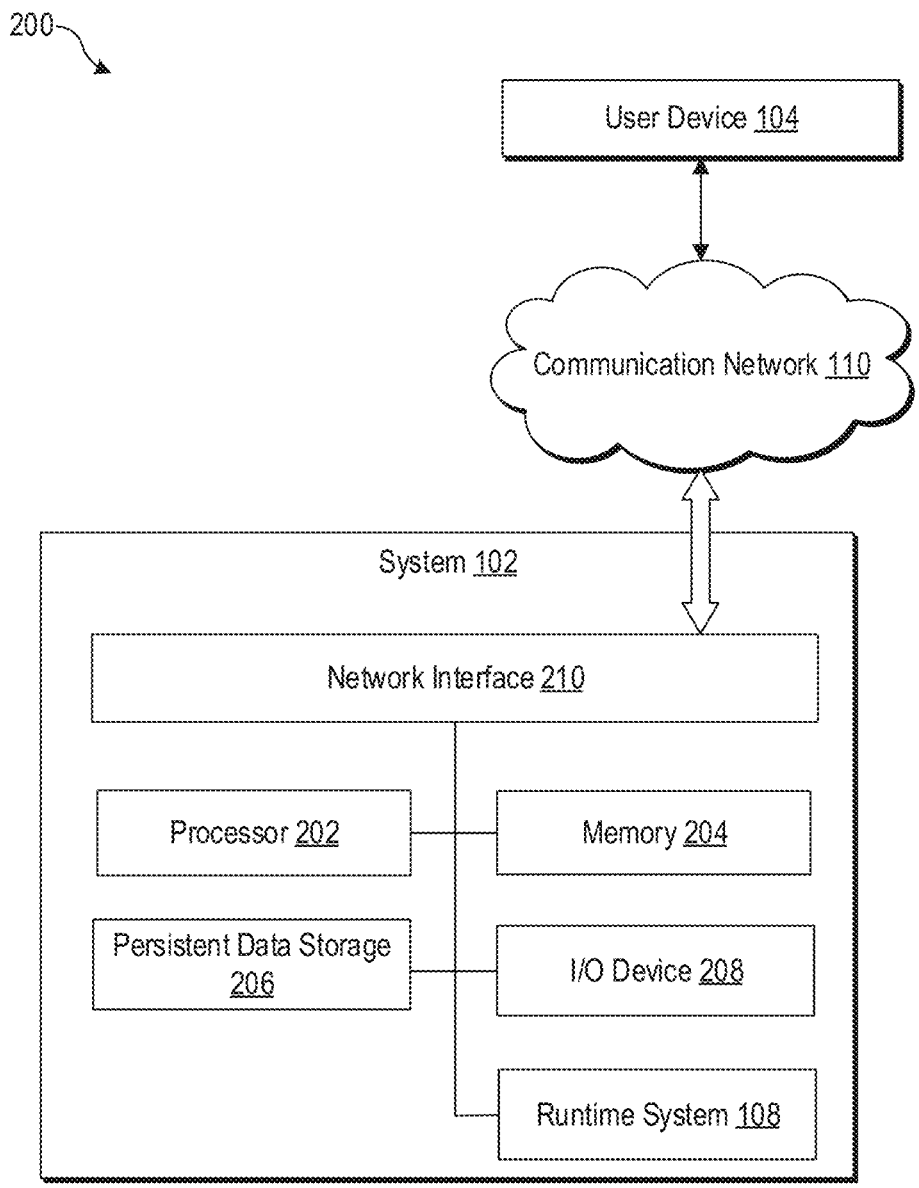
FIG. 2 is a block diagram of a system for code generation for log-based mashup applications.

FIG. 2 is a block diagram of a system for code generation for log-based mashup applications, arranged in accordance with at least one embodiment described in the present disclosure. FIG. 2 is explained in conjunction with elements from FIG. 1. With reference to FIG. 2, there is shown a block diagram 200 of the system 102 of FIG. 1. The system 102 may include a processor 202, a memory 204, a persistent data storage 206, an input/output (I/O) device 208, a network interface 210, and the runtime system 108. There is further shown the user device 104 communicatively coupled to the system 102, via the communication network 110.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure. Additionally, one or more of the processors may be present on one or more different electronic devices, such as different servers.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Graphical Processing Unit (GPU), a Central Processing Unit (CPU), a Reduced Instruction Set Computer (RISC) processor, an Application-Specific Integrated Circuit (ASIC) processor, a Complex Instruction Set Computer (CISC) processor, a co-processor, and/or a combination thereof.

The memory 204 may include suitable logic, circuitry, and/or interfaces that may be configured to store program instructions executable by the processor 202. In certain embodiments, the memory 204 may be configured to store the trigger source path, one or more trigger rules, and one or more computer-executable actions associated with the one or more trigger rules. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202, and a format of a mashup template. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive a user input. The I/O device 208 may be further configured to provide an output in response to the user input. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display device and a speaker.

The network interface 210 may include suitable logic, circuitry, interfaces, and/or code that may be configured to establish a communication among the system 102, and the user device 104, via the communication network 110. The network interface 210 may be implemented by use of various known technologies to support wired or wireless communication of the system 102, via the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

In certain embodiments, the system 102 may be divided into a front-end subsystem and a backend subsystem. The front-end subsystem may be solely configured to receive requests/instructions from the user device 104, one or more of third-party servers, web servers, client machine, and the backend subsystem. These requests may be communicated back to the backend subsystem, which may be configured to act upon these requests. For example, in case the system 102 includes multiple servers, few of the servers may be front-end servers configured to relay the requests/instructions to remaining servers associated with the backend subsystem.

Modifications, additions, or omissions may be made to the system 102, without departing from the scope of the present disclosure. For example, in some embodiments, the system 102 may include any number of other components that may not be explicitly illustrated or described.

Figure 3:
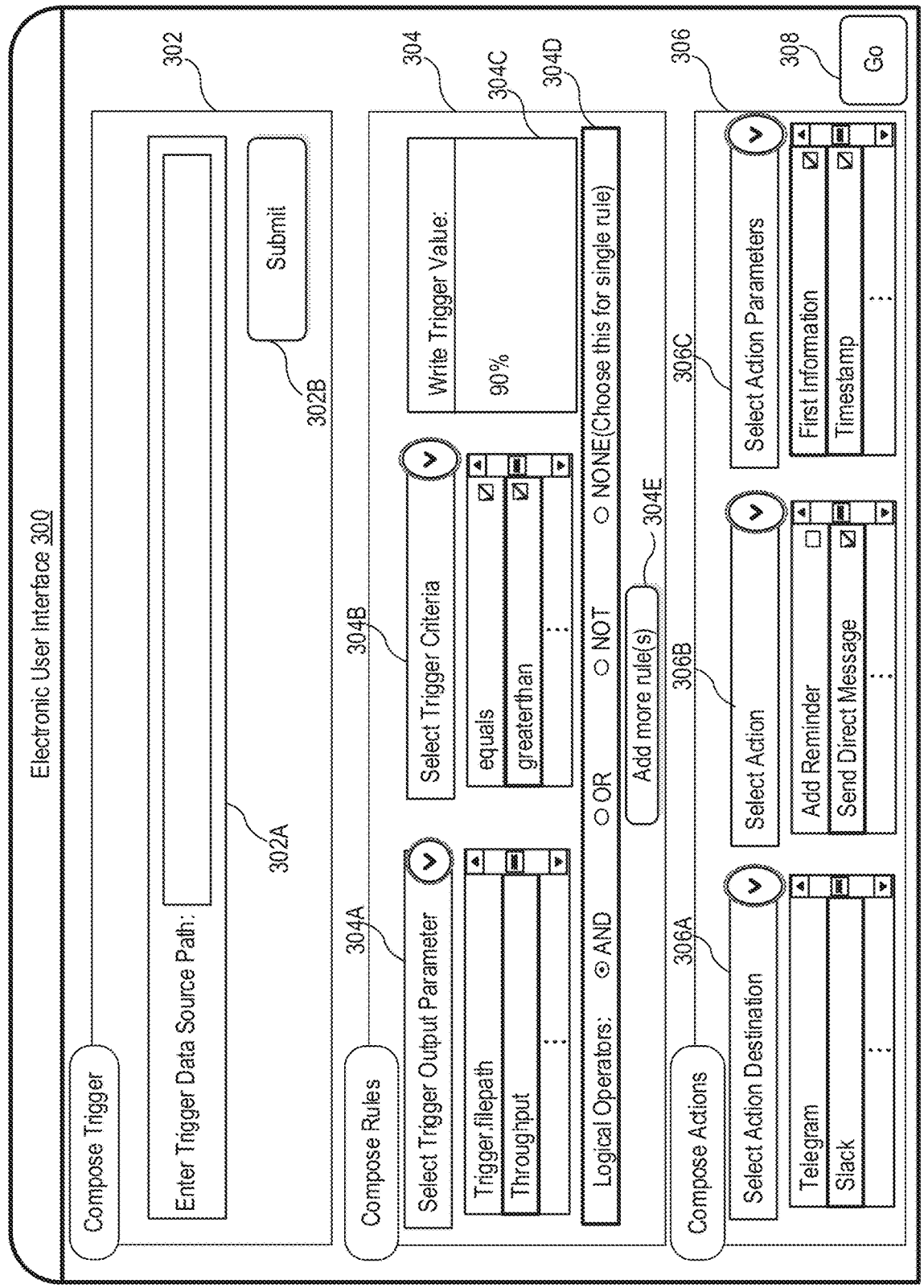
FIG. 3 is a diagram that illustrates an example electronic user interface for providing input(s) for code generation for log-based mashups.

FIG. 3 is a diagram that illustrates an example electronic user interface for providing input(s) for code generation for log-based mashups, according to at least one embodiment described in the present disclosure. FIG. 3 is explained in conjunction with elements from FIG. 1 and FIG. 2. With reference to FIG. 3, there is shown an electronic UI 300, which is an exemplary implementation of the electronic UI 106 of FIG. 1. The electronic UI 300 may be displayed on the user device 104 based on a user request, which may be received via an application interface displayed onto a display screen of the user device 104. The application interface may be part of an application software, for example, a software development kit (SDK), a cloud server-based application, a web-based application, an OS-based application/application suite, an enterprise application, or a mobile application for automatic generation the code for API mashup.

On the electronic UI 300, there is shown a set of UI elements, such as a first UI element 302, a second UI element 304, a third UI element 306, and a fourth UI element 308. Through the first UI element 302, the second UI element 304, the third UI element 306, and the fourth UI element 308, the user 112 may be able to compose a log-based mashup by selecting a trigger data source path, one or more trigger rules, and one or more computer-executable actions. The log-based mashup may be composed to include a computer-executable mashup code based on user input(s) which may be provided via the set of UI elements.

The first UI element 302 may be labelled as, for example, "Compose Triggers" and may include a trigger source path option 302A and a submit button 302B. Through the trigger source path option 302A, the user 112 may be able to provide a user input to specify a path/location of the trigger data source 114. In some embodiments, the trigger source path option 302A may provide an option to browse a list of paths for a corresponding list of available trigger data sources. Upon selection of a path from the list of paths, the selected path may be displayed on the electronic UI 300. In one or more embodiments, the user 112 may be able to select multiple trigger data sources by providing multiple paths associated with the multiple trigger data sources. After the selection, the user 112 may submit the trigger data source path(s) via the submit button 302B.

After the submission, the system 102 may implement a trigger watcher function, which may monitor the trigger data source path and receive first log data from the trigger data source 114 associated with the trigger data source path. The first log data may include first information associated with one or more electronic trigger events. The system 102 may extract one or more trigger output parameters from a first sentence token of the received first log data. For example, if the first sentence is "13:46:00: [WARNING] The throughput is 30 Mbps, using policy limitation of 90%.", then the trigger output parameters may be extracted as "the throughput" and "policy limitation". Details of operations for extraction of trigger output parameters are provided, for example, in FIGS. 6A and 6B.

The second UI element 304 may be labelled as, for example, "Compose Rules". The second UI element 304 may include a trigger output parameter menu 304A, a trigger criteria menu 304B, a trigger value textbox 304C, a logical operator menu 304D, and an add rule(s) button 304E. Through the trigger output parameter menu 304A, the trigger criteria menu 304B, the trigger value textbox 304C, and/or the logical operator menu 304D, and/or the add rule(s) button 304E, a first set of trigger rules may be displayed as a first set of user-selectable options onto the electronic UI 300 of the user device 104. Each trigger rule may be composed of a trigger output parameter, a trigger criterion, a trigger value for the trigger output parameter. The system 102 may receive a first input that may include a selection of one or more trigger rules of the displayed first set of trigger rules.

The trigger output parameter menu 304A may be a drop-down menu that may display multiple trigger output parameters. These trigger output parameters may be populated after the system 102 receives the first log data from the trigger data source 114. In one or more embodiments, these trigger output parameters may include general trigger output parameters (such as Trigger.file_path: the trigger data source path to the first log data, Trigger.file_name: the name of the first log data, Trigger.line: a new line or record appears in the first log data) and trigger output parameters extracted from the first log data. Through the trigger output parameter menu 304A, one or more trigger output parameters may be selected.

The trigger criteria menu 304B may be a drop-down menu listing multiple trigger criteria (also referred to as trigger rule patterns) applicable on the selected one or more trigger output parameters. Through the trigger output parameter menu 304A, one or more trigger criteria may be selected. Examples of multiple trigger criteria with their corresponding description is presented in Table 1, as follows:

TABLE 1

Trigger criteria with description.

| IF Rule Operator | Description |
| --- | --- |
| Equals | If trigger value equals the provided value. |
| Nequals | If trigger value does not equal the provided value. |
| Iequals | If string trigger value equals the provided value case insensitively. |
| Lessthan | If trigger value is less than the provided value. |
| Greaterthan | If trigger value is greater than the provided value. |
| NLessthan | If trigger value is not less than (equals or more than) the provided value. |
| NGreaterthan | If trigger value is not greater than (equals or less than) the provided value. |
| Matchwildcard | If trigger value matches the provided wildcard-like string. This operator provides support for Unix shell-style wildcards such as * and ?. |
| Regex | If trigger value matches the provided regular expression pattern. |
| Iregex | If trigger value matches the provided regular expression pattern case insensitively. |
| Contains | If trigger value contains the provided value. |
| Ncontains | If trigger value does not contain the provided value. |
| Icontains | If string trigger value contains the provided value case insensitively. |
| Incontains | If string trigger value does not contain the provided string value case insensitively. |
| Startswith | If beginning of the string trigger value matches the provided string value. |
| Istartswith | If beginning of the string trigger value matches the provided string value case insensitively. |
| Endswith | If end of the string trigger value matches the provided string value. |
| Iendswith | If end of the string trigger value matches the provided string value case insensitively. |
| timediff__lt | If time difference between trigger value and current time is less than the provided value. |
| timediff__gt | If time difference between trigger value and current time is greater than the provided value. |
| timediff__nlt | If time difference between trigger value and current time is not less than the provided value. |
| timediff__ngt | If time difference between trigger value and current time is not greater than the provided value. |
| Exists | If key exists in payload. |
| Nexists | If key doesn't exist in payload. |
| Inside | If trigger payload is inside provided value. Reverse of contains. |
| Ninside | If trigger payload is not inside provided value. Reverse of ncontains |

The trigger value textbox 302C may be a textbox that may edited by the user 112 to add a trigger value. The trigger value may be considered as an operand for a trigger criterion, which may be selected via the trigger criteria menu 304B. In order to satisfy a trigger rule, the value of the selected trigger output parameter in log data may be compared with the trigger value based on the selected one or more trigger criteria.

In some embodiments, an option may be provided to the user 112 to select a logical operator from the logical operator menu 304D. As shown, for example, the logical operator may be selected through radio buttons displayed on the left of logical operators of the logical operator menu 304D. The logical operator may be selected by the user 112 in case the user 112 wants to add more than one trigger rule while composing the log-based mashup. The user 112 may be provided with another option to add more than one trigger rule by clicking on the add rule(s) button 304E. Upon selection of the add rule(s) button 304E, the system 102 may display a new UI element, which may be similar to the second UI element 304. In the new UI element, the user 112 may be provided with options to compose another trigger rule by selecting new trigger output parameter(s), new trigger criteria, and new trigger value(s).

By way of example, and not limitation, a trigger rule may be composed to have a trigger output parameter as 'the throughput', a trigger criterion as "greater than" and a trigger value as '20 Mbps'. The system 102 may determine whether the value of the throughput in the log data is greater than the trigger value of 20 Mbps. If the rule evaluates to be false, the system 102 may not perform any computer-executable action. If the trigger rule evaluates to be true, the system 102 may perform one or more computer-executable actions which may be specified through the third UI element 306, as described herein.

The third UI element 306 may be labelled as, for example, "Compose Actions" and may include an action destination menu 306A, an action menu 306B, and an action parameter menu 306C. Through the action destination menu 306A, the action menu 306B, the action parameter menu 306C, a plurality of computer-executable actions for the log-based mashup may be displayed to the user 112. The system 102 may receive a second input which may include a selection of one or more computer-executable actions to be performed based on whether the first information (e.g., in first log data) associated with the one or more electronic trigger events satisfies the one or more trigger rules (selected via the second UI element 304). The one or more computer executable actions may be selected from among the plurality of computer-executable actions, as displayed in the third UI element 306. In some exemplary embodiments, the one or more computer executable actions may correspond to one or more API calls to corresponding one or more API endpoints of an API provider.

The action destination menu 306A may be a drop-down menu, which may list a set of action destinations through which a computer-executable action may be performed if the first information (i.e. associated with electronic trigger event(s)) in the first log data satisfies the one or more trigger rules. For example, the set of action destinations may contain a list of API providers, each of which may provide one or more API endpoints as API-based action(s). The user 112 may be provided with options to select one or more actions destinations from among the set of action destinations.

The action menu 306B may be a drop-down menu which may list multiple actions associated with a selected action destination as user-selectable options. Each action in the action menu 306B may correspond to an API endpoint of an API provider (selected as an action destination via the action destination menu 306A). In one or more embodiments, instead of providing the action destination menu 306A, all the action destinations in the action destination menu 306A may be combined with the actions in the action menu 306B to offer a single list of actions. In such an implementation, the text description of an action in the action menu 306B may be concatenated with an action destination (or the API provider name). For example, if the action destination is "Slack®", and the action is "send a message", the text description may be provided as "Send a message on Slack".

The action parameter menu 306C may be a drop-down menu that may display multiple action parameters as user-selectable inputs for the selected action(s) via the action menu 306B. Each action parameter in the action parameter menu 306C may correspond to an endpoint parameter for an API endpoint (i.e. a selected action through the action menu 306B) and may be displayed to the user 112 upon the selection of the action.

By way of example, and not limitation, if the action destination is selected as Slack®, the actions menu 306B may be populated with actions such as, but not limited to, Add Reminder, Send Direct Message, Create Channel, Set Channel Topic, Set Status, Send Channel Message, or Send Private Channel Message. The user 112 may select an action as 'Send Direct message' and may choose action parameters as 'tweet text' and 'tweet timestamp'. The computer-executable action may be composed as an action to send a message on Slack® with the message including the tweet of the specific user and the timestamp of the tweet.

The fourth UI element 308 may be labelled as, for example, "Go" and may be a button. Upon a selection of the button, the system 102 may construct a mashup template based on the trigger data source path provided via the first UI element 302, the first input via the second UI element, and the second input via the third UI element 306.

It should be noted that the electronic UI 300 is merely provided as an exemplary example to illustrate a selection of a trigger data source path, one or more trigger rules, and computer-executable actions and should not be construed as limiting for the present disclosure. In some embodiments, the electronic UI 300 may be suitably modified to allow the user 112 to select multiple trigger data source paths and/or multiple computer executable actions. For instance, through the electronic UI 300, multiple trigger data sources may be selected to trigger one single computer-executable action or one trigger data source to trigger multiple computer-executable actions.

It should also be noted that the trigger rules in the electronic UI 300 are merely provided as an example and should not be construed as limiting for the present disclosure. In some embodiments, the electronic UI 300 may be suitably modified to allow the user 112 to compose more complex trigger rules, such as nested rules (for e.g., if first rule is satisfied, then check if second rule is satisfied, and then trigger an action) or combining multiple trigger rules through a suitable logical operator (for e.g., if both the first rule "AND" the second rule are satisfied, then trigger an action).

It should also be noted that the electronic UI 300 is merely provided as an example to illustrate a step-by-step approach for composing a log-based mashup. The electronic UI 300 may also be configured to follow any other approach, such as a drag and drop approach, where the user 112 may be able to drag and drop multiple blocks using toolboxes (i.e. UIs). The user 112 may be provided with options to configure parameters associated with these multiple blocks and connect arrows between the blocks to establish a relationship among the blocks, without departing from the scope of the present disclosure.

Figure 4:
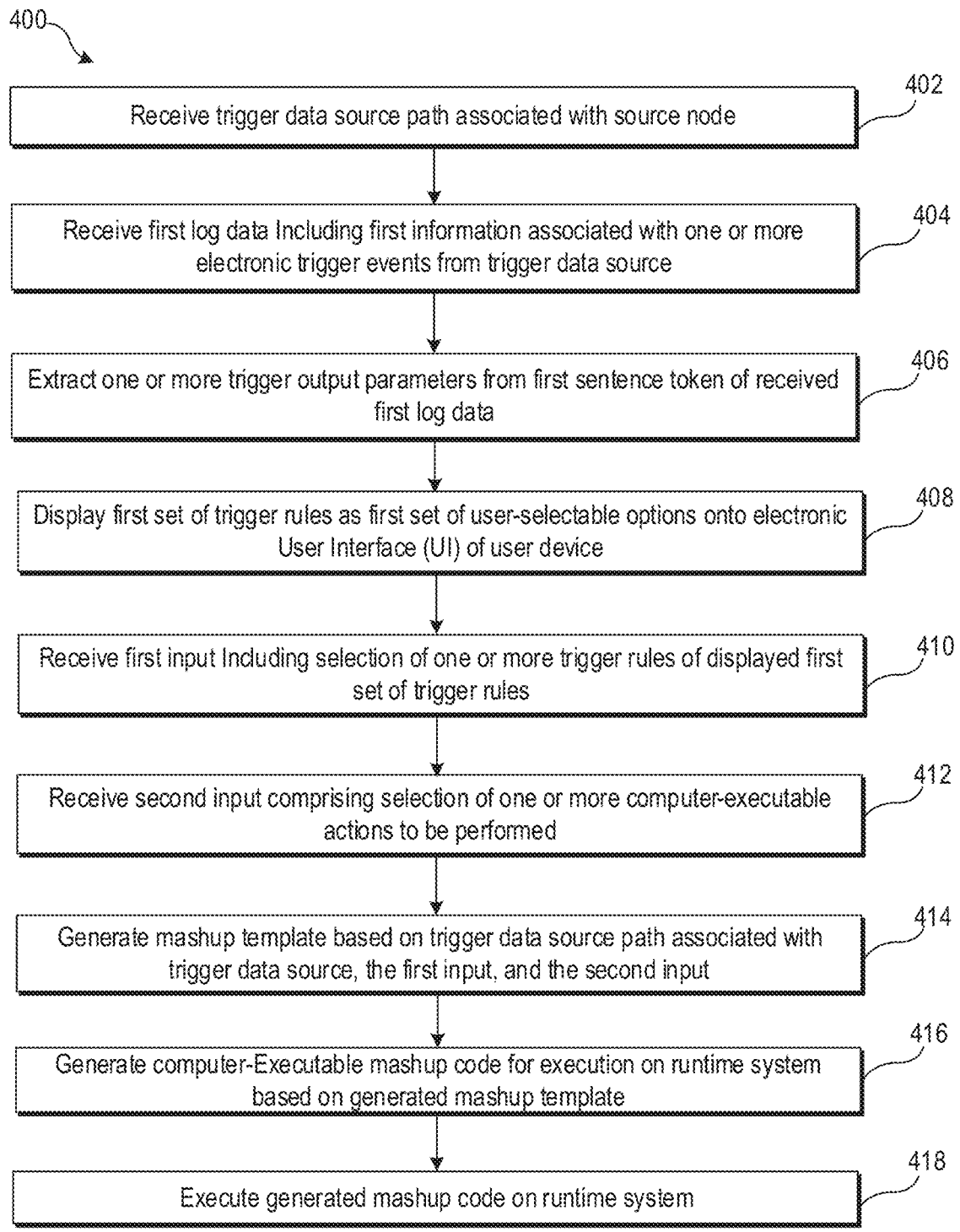
FIG. 4 illustrates a flowchart of an example method of code generation for a log-based mashup.

FIG. 4 illustrates a flowchart of an example method of code generation for a log-based mashup, according to at least one embodiment described in the present disclosure. FIG. 4 is explained in conjunction with elements from FIG.

1, FIG. 2, and FIG. 3. With reference to FIG. 4, there is shown a flowchart 400. The method illustrated in the flowchart 400 may start at 402 and may be performed by any suitable system, apparatus, or device, such as by the system 102 of FIG. 1 or FIG. 2.

At 402, a trigger data source path may be received. The trigger data source path may be associated with the trigger data source 114, which may have to be monitored for a new record in log data. Each new record may correspond to an electronic trigger event. For example, if temperature log data is received from a temperature monitoring device, then new temperature values may correspond to electronic trigger events. In one or more embodiments, the processor 202 may be configured to receive the trigger data source path and select the trigger data source 114 based on the received trigger data source path. For example, as shown in FIG. 3, the trigger data source path may be received via the first UI element 302.

At 404, first log data may be received from the trigger data source 114 and may include first information associated with one or more electronic trigger events. In one or more embodiments, the processor 202 may be configured to receive the first log data including the first information associated with the one or more electronic trigger events from the trigger data source 114. The first information in the first log data may include one or more records (e.g. in the form of one or more sentences) which correspond to the one or more electronic trigger events. Each record in the first log data may be represented in a human-readable format and may include both word-tokens and numerical values.

At 406, one or more trigger output parameters may be extracted from the received first log data. In one or more embodiments, the processor 202 may be configured to extract the one or more trigger output parameters from a first sentence token of the received first log data. For example, the received first log data may be tokenized into a plurality of sentence tokens. From a first sentence token of the plurality of sentence tokens, a first set of word tokens may be extracted. Such word tokens may include one or more of nouns, noun phrases, or named entities as the one or more trigger output parameters. Additionally, or alternatively, in the first sentence token, a word token with a dependency of a nominal subject or a head of prepositional modifier may be extracted as a trigger output parameter based on a determination that there is another word token in the first sentence token which is a named entity and has a dependency of a direct object or an object of a preposition. Further details about extraction of the one or more trigger output parameters are described, for example, in FIGS. 6A and 6B.

In one or more embodiments, the one or more trigger output parameters may general parameters associated with the first log data. Examples of such general parameters may include, but are not limited to, a trigger data source path of the first log data, a name of a log file which contains the first log data, a specific line or record number in the first log data, and a new line or record number in the first log data.

At 408, a first set of trigger rules may be displayed based on the extracted one or more trigger output parameters. The first set of trigger rules may be displayed as a first set of user-selectable options onto the electronic UI 106 of the user device 104. In one or more embodiments, the processor 202 may be configured to display the first set of trigger rules as the first set of user-selectable options onto the electronic UI 106 of the user device 104 based on the extracted one or more trigger output parameters. Each trigger rule may include one or more trigger output parameters, a trigger criterion, and a trigger value.

At 410, a first input may be received. The first input may correspond to a selection of one or more trigger rules of the displayed first set of trigger rules. In one or more embodiments, the processor 202 may be configured to receive the first input which includes the selection of one or more trigger rules of the displayed first set of trigger rules. Details of the selection of the trigger rules are provided, for example, in FIG. 3.

At 412, a second input may be received. The second input may include a selection of one or more computer-executable actions. The one or more computer-executable actions may be performed based on whether the first information associated with the one or more electronic trigger events satisfies the one or more trigger rules (received as the first input at 410). In one or more embodiments, the processor 202 may be configured to receive the second input which includes the selection of the one or more computer-executable actions. Details of the selection of the computer-executable actions are provided, for example, in FIG. 3.

At 414, a mashup template may be generated based on the trigger data source path (provided at 402) associated with the trigger data source 114, the first input (provided at 410), and the second input (provided at 412). In one or more embodiments, the processor 202 may be configured to generate the mashup template. The mashup template may include the trigger data source path, the first set of trigger rules, and the action parameters for the one or more computer-executable actions. Each trigger rule in the first set of trigger rules may include a trigger criterion, a trigger value, and a trigger output parameter. An example of the mashup template is provided is FIG. 5.

In one or more embodiments, the generated mashup template may be a conditional template based on an IF This Then That (IFTTT) approach, whereby an action is triggered when a trigger satisfies a rule. The data in the generated mashup template may be structured as key-value pairs in a suitable file format, such as JavaScript Object Notation (JSON) or Extensible Markup Language (XML). The data may include, for example, the name of the log-based mashup, the description of the log-based mashup, the enabled state of a trigger rule in the log-based mashup (can be either true or false), executable code(s) for one or more trigger rules, input parameters (such as a trigger criteria or a trigger value) associated with the trigger rules, executable code(s) for one or more computer-executable actions, and a set of parameters to pass to the executable code for one or more computer-executable actions.

In one or more embodiments, the mashup template may be generated to support various trigger-action scenarios, such as a single trigger data source causing a single computer-executable action, a single trigger data source causing multiple computer-executable actions, multiple trigger data sources causing a single computer-executable action, or multiple trigger data sources causing multiple computer-executable actions.

At 416, a computer-executable mashup code may be generated based on the mashup template (generated at 414). The computer-executable mashup code may be configured to be executable on the runtime system 108 and may include one or more computer-executable trigger codes associated with retrieval of log data and detection of electronic trigger events, one or more computer-executable rule codes associated with the one or more trigger rules and one or more computer-executable action codes associated with the one or more computer-executable actions. In one or more embodiments, the computer-executable trigger code may be generated further based on the received first data source path associated with the trigger data source. The computer-executable mashup code may be written in any suitable programming language, or a combination of programming languages, including, but not limited to, Java, Java 2ME, C/C++, Perl, Python.

In one or more embodiments, the one or more computer-executable trigger codes may correspond to one or more programs which implement a trigger watcher function to monitor the trigger data source path (specified at 402) to look up for log data files which contain new records as electronic trigger events.

In one or more embodiments, each computer-executable rule code may include a sequence of code sections, such as a function declaration in which the value of the trigger output parameter in the log data and the trigger value may be provided as input, a corner case check, a check to determine whether the value of the trigger output parameter in the log data and the trigger value are formatted, and a call to a built in operator (as the rule operator/trigger criteria) to evaluate a result of a trigger rule. Typically, a corner case involves a problem or situation that occurs only outside of normal operating parameters, especially one that manifests itself when multiple environmental variables or conditions are simultaneously at extreme levels, even though each parameter is within the specified range for that parameter.

In one or more embodiments, the computer-executable action code may be generated based on an API specification file, such as an Open API Specification (OAS) file. The API specification file may include necessary information to call an API endpoint to perform a computer-executable action. For example, the API specification file may include information, such as an API host address, API endpoints, and endpoint parameters for the API endpoints.

In an embodiment, the processor 202 may retrieve information including, but not limited to, an API host address, API endpoints, and endpoint parameters from the API specification file for an API associated with a computer-executable action. The processor 202 may generate a computer-executable action code of the one or more computer-executable action codes based on the retrieved information and an action code template. For example, the action code template may be populated with the retrieved information to generate the computer-executable action code. The generated computer-executable action code may be included in the computer-executable mashup code for the log-based mashup.

At 418, the generated mashup code may be executed on the runtime system 108. Herein, the runtime system 108 may refer to collection of managed hardware and software resources which are typically required for program execution. The execution of the mashup code may include the execution of the one or more computer-executable trigger codes, the one or more computer-executable rule codes associated with the one or more trigger rules, and the one or more computer-executable action codes associated with the one or more computer-executable actions. In one or more embodiments, the runtime system 108 may execute the one or more computer-executable trigger codes to receive second log data from the trigger data source 114 and to extract second information associated with the one or more electronic trigger events. Thereafter, the runtime system 108 may execute the one or more computer-executable rule codes to generate a trigger response based on a determination that the extracted second information satisfies the one or more trigger rules. The runtime system 108 may further execute the one or more computer-executable action codes to perform the one or more computer-executable actions based on the trigger response.

In an embodiment, a computer-executable action may be an API-based action which may be performed if the generated trigger response is true (1). With the execution of the computer-executable action code, API call(s) may be made to respective API endpoint(s) of API provider(s) to perform the API-based action. For example, the log data may contain a value of 80 degrees Fahrenheit for a trigger output parameter "room temperature" with a trigger value of 68 degrees Fahrenheit. If the trigger criterion is "is greater than", then the trigger response may be true (1) as 80 degrees Fahrenheit is greater than the trigger value of 68 degrees Fahrenheit. As the trigger response indicates that the trigger rule is satisfied, a computer-executable action may be performed by posting a notification on Slack®. In order to post the notification, a computer-executable action code may be executed to post an API call to the Slack® server for posting the notification. The user ID associated with the Slack® may be provided as an endpoint parameter (i.e. an action parameter) with the API call.

Control may pass to end. Although the flowchart 400 is illustrated as discrete operations, such as 402, 404, 406, 408, 410, 412, 414, 416, and 418. However, in certain embodiments, such discrete operations may be further divided into additional operations, combined into fewer operations, or eliminated, depending on the particular implementation without detracting from the essence of the disclosed embodiments.

Figure 5:
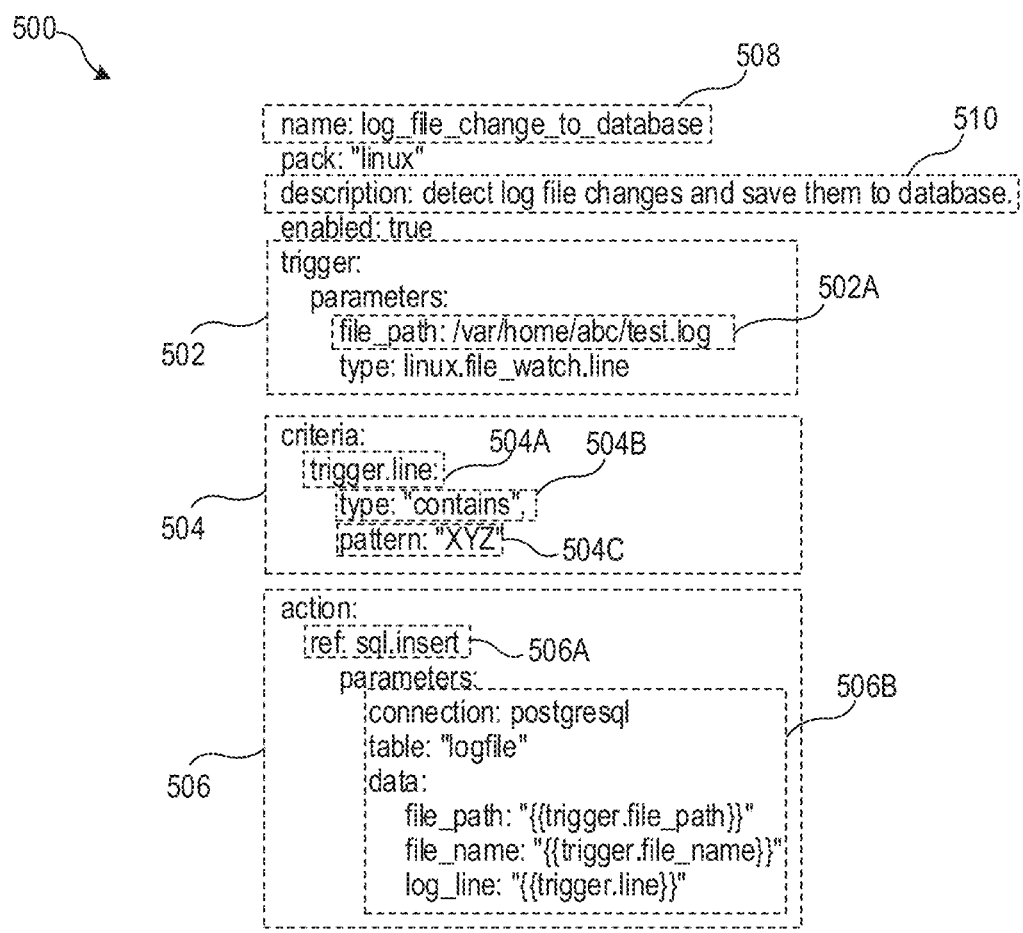
FIG. 5 illustrates an example mashup template.

FIG. 5 illustrates an example mashup template, according to at least one embodiment described in the present disclosure. FIG. 5 is explained in conjunction with elements from FIG. 1, FIG. 2, FIG. 3, and FIG. 4. With reference to FIG. 5, there is shown a mashup template 500, which may be constructed based on the received first input (received at 410) and the received second input (received at 412).

The system 102 may construct the mashup template 500 based on an IFTTT (If this then that) approach. With the IFTTT approach, the mashup template 500 may include a trigger section 502, a rule section 504, and an action section 506. The mashup template 500 may contain data in a structured format. As an example, the mashup template 500 is shown in a JSON (or YAML) format with key-value pairs. A brief description of common keys of the mashup template 500 is provided in Table 2, as follows:

TABLE 2

| Description of common keys in the mashup template 500 |
|---|
| Name: the name of the log-based mashup<br>Description: the description of the log-based mashup<br>Enabled: the enabled state of a trigger rule (true or false)<br>Code: reference to the executable code for trigger<br>Parameters:<br>  file_path: Trigger data source path<br>  file_type: type of log file<br>Rule: including<br>  An attribute of the trigger payload<br>  The type of criteria comparison<br>  The pattern to match against<br>Action: execution when a rule is matched<br>Code: reference to the executable code for action<br>Parameters: a set of parameters to pass to the action execution |

The data in the mashup template 500 may include a name 508 of the mashup template 500 and a description 510 of the mashup template 500. The trigger section 502 may include a trigger data source path 502A which lists the path or URL of the trigger data source 114. The rule section 504 may include a trigger output parameter 504A, trigger criterion 504B, and a trigger value 504C. Similarly, the action section 506 may include an action 506A as "sql.insert" and action parameters 506B as "connection: postgresql", "table:"logfile","Data:file_path:"{{triggerfile_path}}",file_name:"{{trigger .file_name}}"", and log_line:"{{triggerline}}"". When executed on the runtime system 108, the mashup code, generated based on the mashup template 500, may be configured to insert the value of file_path, file_name, and log_line in the logfile table.

Figure 6A:
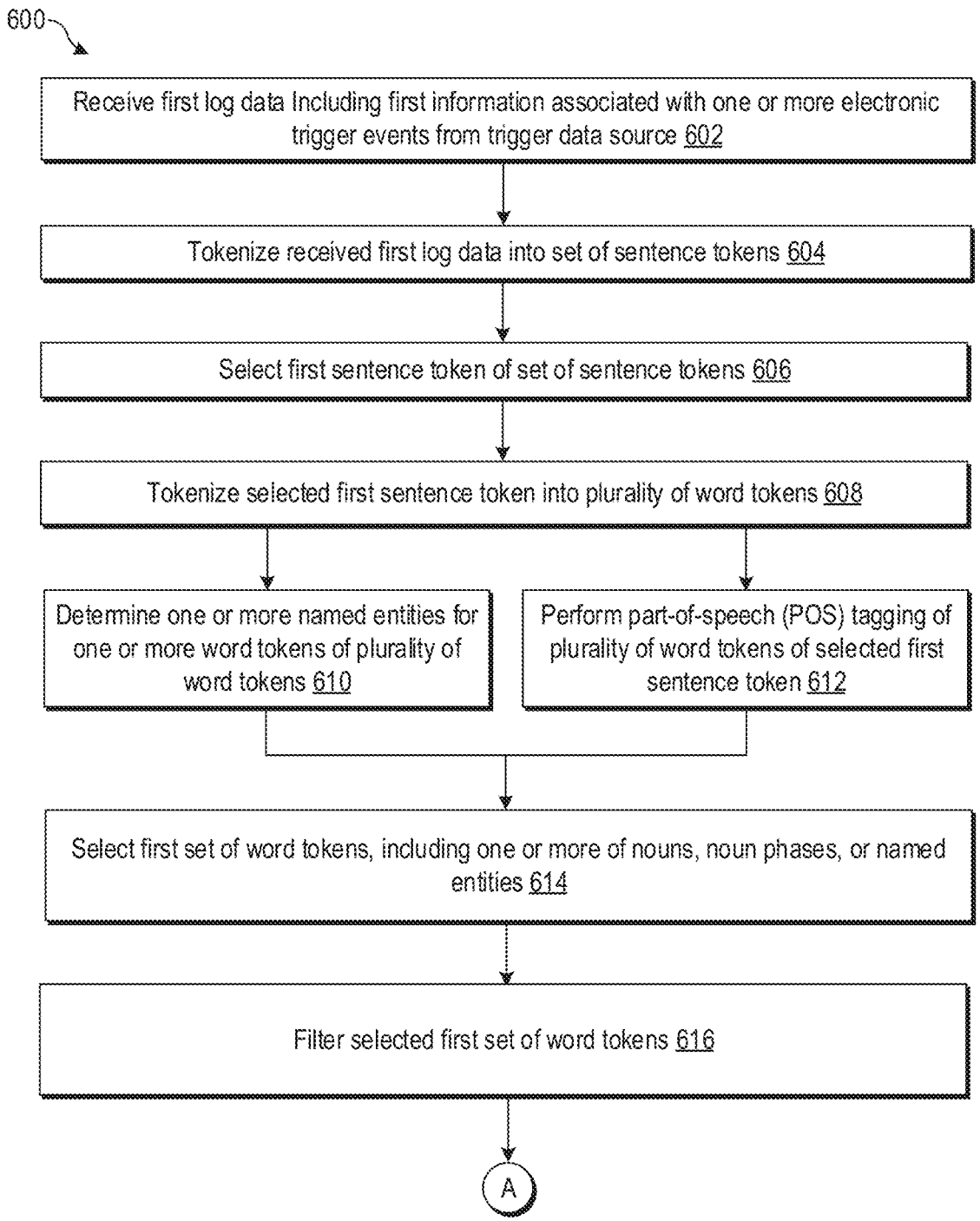
FIGS. 6A and 6B, collectively, illustrate a flowchart of an example method of extraction of one or more trigger output parameters from log data.
Figure 6B:
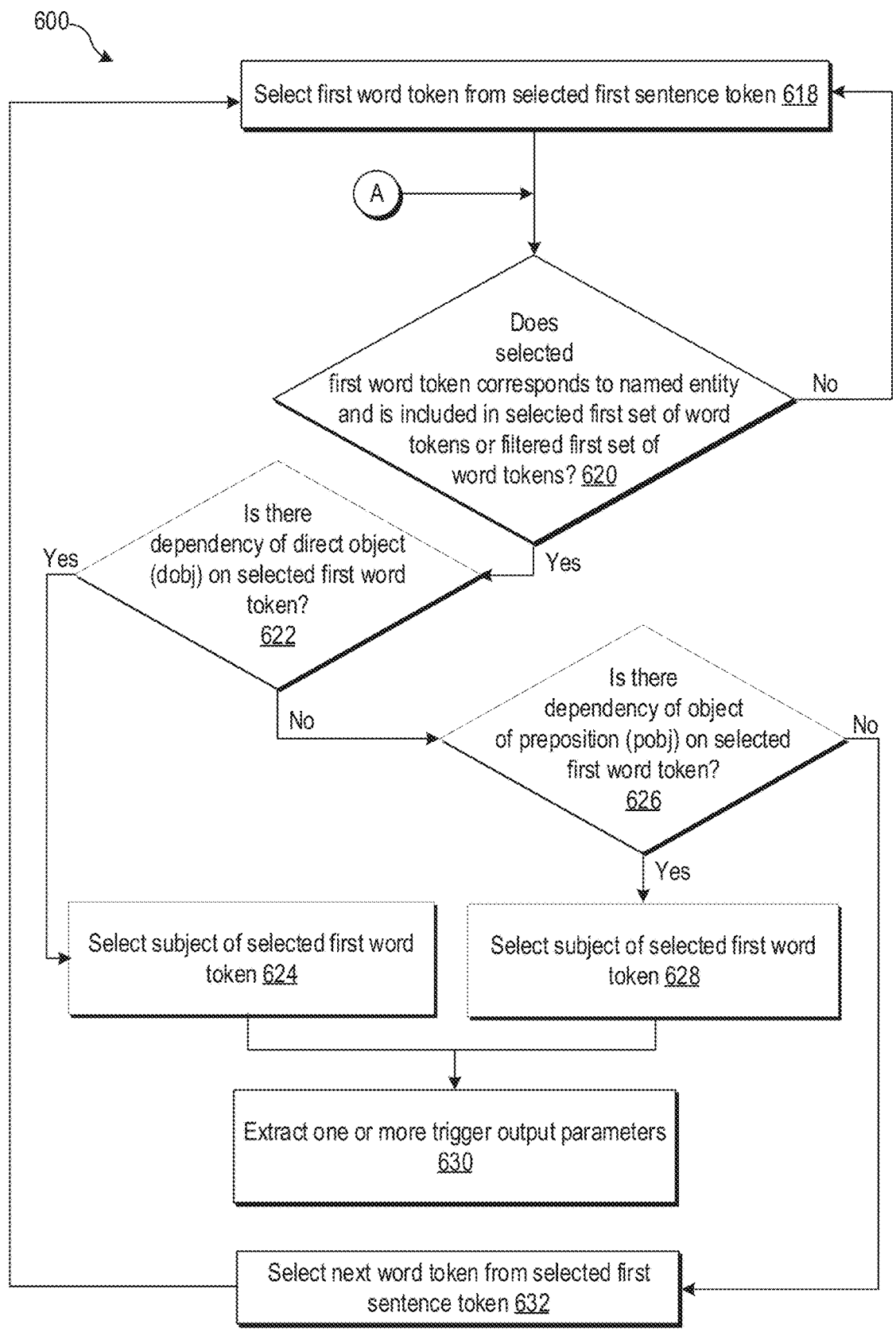

FIGS. 6A and 6B, collectively, illustrate a flowchart of an example method of extraction of one or more trigger output parameters from log data, according to at least one embodiment described in the present disclosure. FIGS. 6A and 6B are explained in conjunction with elements from FIG. 1, FIG. 2, FIG. 3, FIG. 4, and FIG. 5. With reference to FIGS. 6A and 6B, there is shown a flowchart 600. The method illustrated in the flowchart 600 may start at 602 and may be performed by any suitable system, apparatus, or device, such as by the system 102 of FIG. 1 or FIG. 2.

At 602, first log data may be received from the trigger data source 114 and may include first information associated with one or more electronic trigger events. In one or more embodiments, the processor 202 may be configured to receive first log data including the first information associated with one or more electronic trigger events from the trigger data source 114. The first information in the first log data may include one or more sentences as one or more records indicating one or more electronic trigger events.

At 604, the received first log data may be tokenized into a set of sentence tokens. In one or more embodiments, the processor 202 may be configured to tokenize the received first log data into the set of sentence tokens. The tokenization may be performed based on a punctuation mark, such as a 'full stop', a comma, a colon, or a semicolon. In some embodiments, the tokenization may be performed by an NLP sentence tokenization tool, such as, but not limited to, Natural Language Toolkit (NTLK) and Spacy®.

At 606, a first sentence token may be selected from the set of sentence tokens. In one or more embodiments, the processor 202 may be configured to select the first sentence token of the set of sentence tokens. For example, the first sentence token may correspond to a recently updated line number or a recently updated record in the first log data. For example, the first sentence token from a Juniper® device log file may be "the throughput is 25 Mbps".

At 608, the selected first sentence token may be tokenized into a plurality of word tokens. In one or more embodiments, the processor 202 may be configured to tokenize the selected first sentence token into the plurality of word tokens. The tokenization of the selected first sentence token may work by separating word tokens using punctuations (such as commas, semi-colons, hyphens) and spaces, or using NLP word tokenization tools, such as NTLK and Spacy®. With reference to the previous example, the first sentence token "the throughput is 25 Mbps" may be tokenized into five-word tokens, namely 'the', 'throughput', 'is', '25', and 'Mbps'.

At 610, one or more named entities may be determined for one or more word tokens of the plurality of word tokens. In one or more embodiments, the processor 202 may be configured to determine the one or more named entities for the one or more word tokens of the plurality of word tokens. Each named entity may provide a label to a respective word token with a real-world concept that the respective word token represents. For example, each named entity may represent whether the respective word token is one of a name of a person, a name of a company/business, a geographical location, a name of a product, a timestamp, an amount of money, a name of an event, a cardinal value, or a percentage, or other user-defined named entities. Referring to the previous example, a named entity for one of the five-word tokens may be provided in Table 3, as follows:

TABLE 3

| Name entities for the word tokens | |
|---|---|
| Word Token | Named Entity |
| The | — |
| throughput | — |
| is | — |
| 25 | Cardinal Number |
| Mbps | — |

At 612, a part-of-speech (POS) tagging of the plurality of word tokens of the selected first sentence token may be performed. The POS tagging may be performed to identify a POS tag for each word token of the first sentence token. The parts-of-speech tags may include, for example, a cardinal number, a verb, a noun, a pronoun, an adjective, a determiner, an adverb, a preposition, a conjunction, and an interjection. In one or more embodiments, the processor 202 may be configured to perform the POS tagging of the plurality of word tokens of the selected first sentence token. Referring to the previous example, the POS tags for the five-word tokens are provided in Table 4, as shown follows. Also, noun phrase can be extracted based on POS. Noun phrases are part of speech patterns that include a noun. They can also include whatever other parts of speech make grammatical sense and can include multiple nouns. For example, the noun phrases are provided in Table 4, as shown follows:

TABLE 4

| POS tags for word tokens | |
|---|---|
| Word Token | POS Tag |
| The | DT (Determiner) |
| Throughput | NN (Common Noun) |
| Is | VBZ (Verb) |
| 25 | CD (Cardinal Number) |
| Mbps | NNS (Noun, Plural) |
| The throughput | Noun Phrase |

At 614, a first set of word tokens which includes one or more of nouns, noun phrases, or named entities may be selected. The first set of tokens may be selected from the plurality of word tokens (obtained at 608) based on the POS tagging (at 612) and the determined one or more named entities (at 610). In one or more embodiments, the processor 202 may select the first set of word tokens based on the POS tagging and determined one or more named entities. Referring to the previous example, the first set of word tokens may include "the throughput" as it represents a Noun Phrase.

At 616, the first set of word tokens may be filtered to avoid multiple reoccurrences of a word token with multiple POS tags. For example, from Table 4, the sentence token includes "throughput" as "NN" and "the throughput" as "Noun Phrase". In this case, the system 102 may filter the first set of word tokens to only include "the throughput" (as Noun Phrase) as it contains the term "throughput".

At 618, a first word token may be selected from the selected first sentence token. Such selection may be performed in a first iteration over word tokens of the selected first sentence token.

At 620, it may be determined whether the selected first word token corresponds to a named entity and is included in the selected first set of word tokens (or the filtered first set of word tokens, obtained at 616). In case the selected first word token corresponds to a named entity and is included in the selected first set of word tokens (or the filtered first set of word tokens), control may pass to 622. Otherwise, control may pass to 618 to perform another iteration for selection of a next word token from the selected first sentence token and then control may pass to 620.

At 622, it may be determined whether the selected first word token has a dependency of a direct object (dobj). The direct object may be a noun or a noun phrase that may receive the action of the verb. In one or more embodiments, the processor 202 may be configured to determine whether the selected first word token has a dependency of a direct object (dobj). In case the selected first word token has a dependency of a direct object (dobj), control may pass to 624. Otherwise, control may pass to 626.

At 624, the subject of the selected first word token is selected. To do so, a second word token may be selected from the selected first sentence token based on a determination that the selected first word token is having a dependency of a direct object (dobj). The second word token may be the most left word of the first sentence token with the dependency of a nominal subject (nsubj). In other words, the second word token may be a syntactic child that occurs before the selected first word token. Control may pass to 628.

At 626, it may be determined whether the selected first word token has a dependency of an object of preposition (pobj). The object of preposition may be a noun or a noun phrase that may be governed by a preposition. In one or more embodiments, the processor 202 may be configured to determine whether the selected first word token has a dependency of the object of preposition (pobj). In case the selected first word token has a dependency of the object of a preposition (pobj), control may pass to 628. Otherwise, control may pass to 632.

At 628, the subject of the selected first word token is selected. To do so, a second word token may be selected from the selected first sentence token based on a determination that the selected first word token is having a dependency of an object of preposition (pobj). The second word token may have a dependency of prepositional modifier (prep), and the head of the second word token may be the subject of the selected first word token. In one or more embodiments, the processor 202 may be configured to select a second word token, from the selected first sentence token, having a dependency of prepositional modifier (prep) based on a determination that the selected first word token is having a dependency of an object of a preposition (pobj).

At 630, the one or more trigger output parameters may be extracted by extracting the selected second word token (at 624 or at 628) from the first sentence token.

At 632, control may pass to 618 to perform another iteration for selection of a next word token from the selected first sentence token. After the selection, operations from 620 to 632 may be repeated till the last word token of the selected first sentence token. This may be performed if the selected first word token has neither a dependency of a direct object (dobj) nor an object of a preposition (pobj).

Control may pass to end. Although the flowchart 600 is illustrated as discrete operations, such as 602, 604, 606, 608, 610, 612, 614, 616, 618, 620, 622, 624, 626, 628, 630, and 632. However, in certain embodiments, such discrete operations may be further divided into additional operations, combined into fewer operations, or eliminated, depending on the particular implementation without detracting from the essence of the disclosed embodiments.

Figure 7:
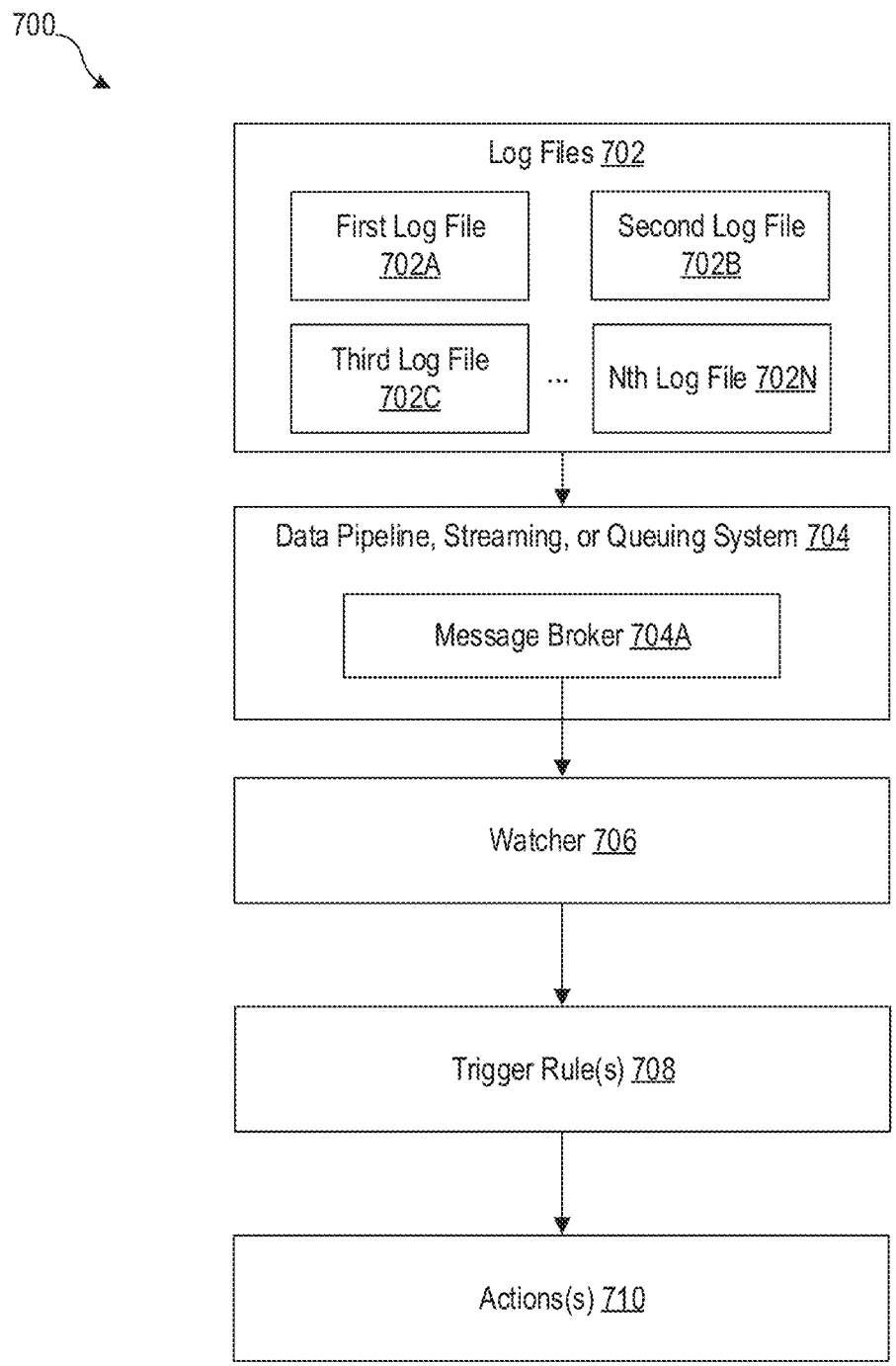
FIG. 7 illustrates an exemplary pipeline for receiving log data from a data pipeline, streaming, or queuing system.

FIG. 7 illustrates an exemplary pipeline for receiving log data from a data pipeline, streaming, or queuing system, according to at least one embodiment described in the present disclosure. FIG. 7 is explained in conjunction with elements from FIG. 1, FIG. 2, FIG. 3, FIG. 4, FIG. 5, and FIGS. 6A and 6B. With reference to FIG. 7, there is shown a block diagram of an exemplary pipeline 700, which includes log files 702, a data pipeline, streaming, or queuing system 704, a watcher 706, a trigger rule(s) block 708, and an action(s) block 710. The watcher 706, the trigger rule(s) block 708, and the action(s) block 710 may be implemented using software and/or hardware resources of the system 102.

The data pipeline, streaming, or queuing system 704 may be implemented as a highly distributed system with a high availability requirement (e.g., Kafka®). In such an implementation, the watcher 706 may not directly monitor the trigger data source path(s) for the log files 702. Instead, the watcher 706 may monitor the output the data pipeline, streaming or queueing system 704. At first, the data pipeline, streaming, or queuing system 704 may receive the log files 702 (such as a first log file 702A, a second log file 702B, a third log file 702C, and an nth log file 702N) from various distributed trigger data sources. The data pipeline, streaming, or queuing system 704 may include a message broker 704A which may publish a plurality of topics, according to a publish-subscribe network protocol, such as MQ Telemetry Transport (MQTT) protocol. In case of MQTT, the message broker 704A may also be referred to as an MQTT broker. Each published topic may correspond to a type of log data or a particular version of a log file. For example, if the first log file 702A includes temperature data and the second log file 702B include ambient pressure data, then the message broker 704A may publish two topics, such as temperature and pressure. The watcher 706 may be implemented as a subscriber (e.g., an MQTT client) and may subscribe to one or more topics of the message broker 704A. Herein, the message broker 704A may act as the trigger data source for the system 102.

The watcher 706 may receive, from the message broker 704A, a first message payload associated with a first topic (for example, temperature) based on the subscription. Thereafter, the watcher 706 may extract the first log data in the form of the first log file 702A from the first message payload. The first log data may be used as a reference to extract trigger output parameters (as described in FIG. 4 and FIGS. 6A and 6B). At any time, the watcher 706 may receive, from the message broker 704A, a second message payload associated with the first topic after receiving the first message payload. The watcher 706 may extract, from the second message payload, second log data based on a determination that the second log data include second information which is different from the first information in the first log data. In other words, the second information in the second log data may include new datapoints or records (e.g., represented by new line numbers or values).

The trigger rule(s) block 708 may analyze the second log data to determine if one or more trigger rules (e.g., as selected at 406) of FIG. 4) are satisfied. Thereafter, the trigger rule(s) block 708 may provide a trigger response (e.g., 1 for satisfied and 0 for not satisfied) to the action(s) block 710, indicating whether the one or more trigger rules are satisfied or not. The action(s) block 710 may perform one or more computer-executable actions based on the trigger response.

Figure 8:
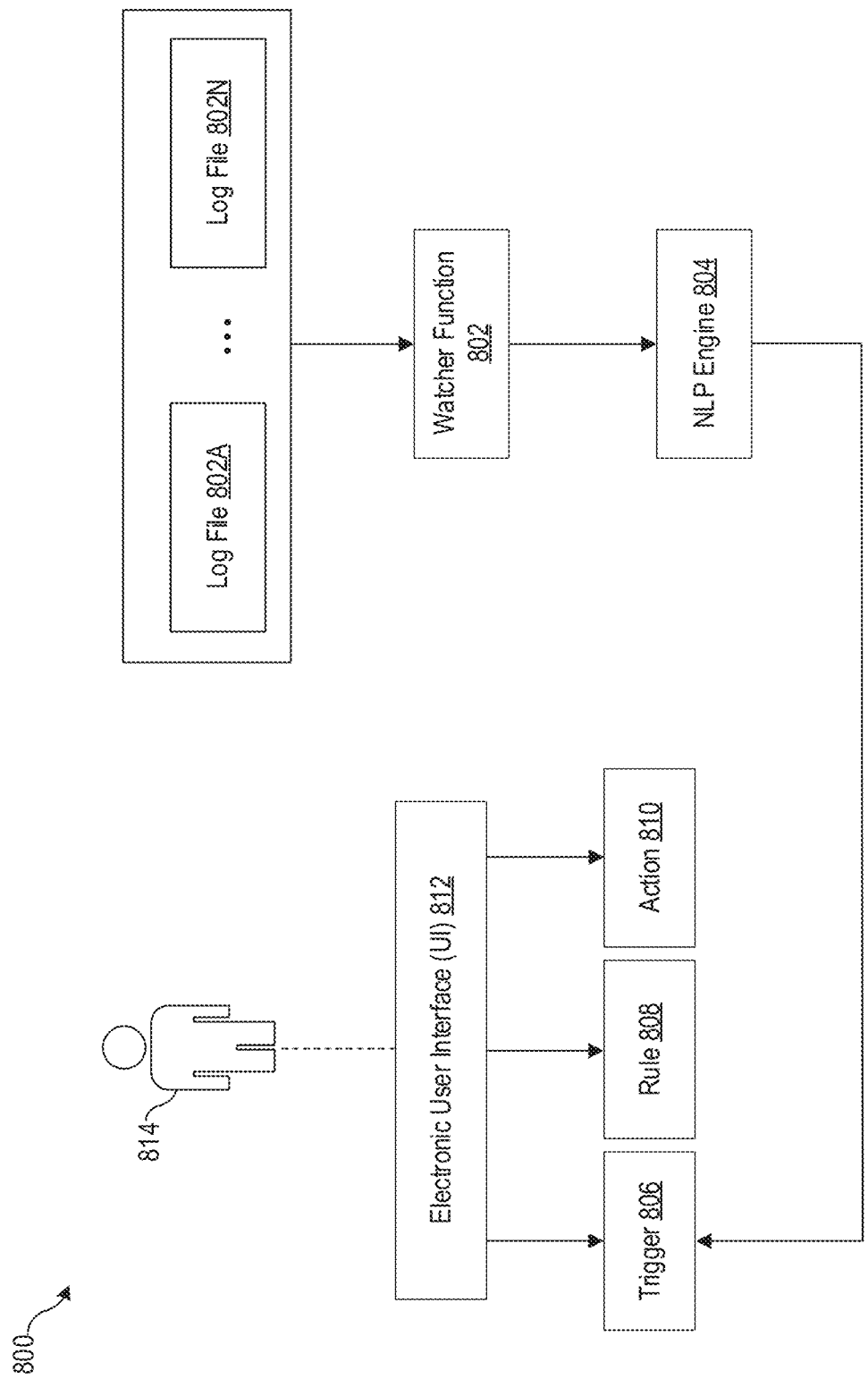
FIG. 8 is an exemplary diagram that represents an exemplary processing pipeline for code generation for a log-based mashup, all according to at least one embodiment described in the present disclosure.

FIG. 8 is an exemplary diagram that represents an exemplary processing pipeline for code generation for a log-based mashup, according to at least one embodiment described in the present disclosure. FIG. 8 is explained in conjunction with elements from FIG. 1, FIG. 2, FIG. 3, FIG. 4, FIG. 5, FIG. 6A, FIG. 6B, and FIG. 7. With reference to FIG. 8, there is shown a processing pipeline 800. The processing pipeline 800 may include a watcher function 802, an NLP engine 804, a trigger block 806, a rule block 808, an action block 810, and an electronic User Interface (UI) 812. There is further shown a user 814 who may configure the trigger (i.e. input the trigger data source path), the one or more trigger rules, and the one or more computer-executable actions via the electronic UI 812.

The watcher function 802, the NLP engine 804, the trigger block 806, the rule block 808, and the action block 810 may be implemented through one or more of program codes, microservices, or hardware-based resources on the system 102. Modifications may be made to such blocks and functions. For example, such blocks or functions may be further divided into additional blocks of operations, combined into fewer blocks of operations, or eliminated, depending on the particular implementation without detracting from the essence of the disclosed embodiments.

The watcher function 802 may be configured to monitor trigger data source paths to receive log files 802A . . . 802N from trigger data source(s). The watcher function 802 may monitor the log files 802A . . . 802N to detect new log data in any of the log files 802A . . . 802N. The new log data may be provided as input to the NLP engine 804. The NLP engine 804 may extract trigger output parameters, which may be provided as input to the trigger block 806 for configuration of trigger rules. These trigger output parameters may be displayed on the electronic UI 812 to allow the user 814 to configure one or more trigger rules that may include one or more trigger output parameters.

After configuring the one or more trigger rules, the user 816 may further configure one or more computer-executable actions via the electronic UI 812. Such actions may be performed based on whether information associated with one or more electronic trigger events in the new log data satisfies the one or more trigger rules. The user 816 may then provide an input to generate a computer-executable mashup code for execution on the runtime system 108.

By way of example, and not limitation, in database systems, the computer-executable mashup code may be generated to send a message to Slack® whenever a new row is inserted into a table. These database systems may produce write-ahead logging (WAL) log files. Operations to be performed in the table may be recorded first in the WAL log files before they are executed in the table. Therefore, the WAL log files may record log data for all operations on the table. These watcher function 802 may receive the WAL log files to detect whether a new row is inserted in the table and then send a message to Slack® to notify the user 814. Access to the WAL log files may utilize less computing and memory resources than directly accessing database on these database systems. For such detection, the value of a trigger output parameter, such as an entry associated with a line number in a WAL log may be matched with a trigger value "INSERT INTO". If the entry contains the trigger value, then a computer-executable action may be performed to send a message on Slack®.

By way of another example, and not limitation, log files used in Linux/Windows servers may be used to help IT professionals to detect and diagnose different problems. An example list of log files of a Linux server with brief descriptions is provided in Table 5, as follows:

TABLE 5

Linux Server log with description

| Log Files | Description |
| --- | --- |
| /var/log/messages | General message and system related stuff |
| /var/log/auth.log | Authentication logs |
| /var/log/kern.log | Kernel logs |
| /var/log/cron.log | Cron logs (cron job) |
| /var/log/maillog | Mail server logs |
| /var/log/qmail/ | Qmail log directory (more files inside this directory) |
| /var/log/httpd/ | Apache access and error logs directory |
| /var/log/lighttpd/ | Lighttpd access and error logs directory |
| /var/log/boot.log | System boot log |
| /var/log/secure or/ var/log/auth.log | Authentication log |
| /var/log/utmp or/ var/log/wtmp | Login records file |

Referring to Table 5, the mashup code may be generated to detect hacking events by monitoring the/var/log/auth.log file. Alternatively, the mashup code may be generated to monitor the execution of the scheduled task may by analyzing the /var/log/cron.log log file. Alternatively, the mashup code may be generated to detect kernel errors by analyzing the/var/log/kern.log log file.

Embodiments described in the present disclosure may be used in many application areas, such as IoT applications, database management systems, or event processing applications. For example, in a health monitoring system, new measurement results of wearable IoT devices of a patient may be saved in one or more logs, which may be used to generate a log-based mashup to trigger actions, such as to inform the patient or associated doctor about critical health conditions of the patent in real or near-real time. For instance, a message may be sent to a health provider if the heartbeat and the blood pressure of the patient exceeds set thresholds for heart rate and blood pressure.

Various embodiments of the disclosure may provide one or more non-transitory computer-readable storage media configured to store instructions that, in response to being executed, cause a system (such as the system 102) to perform operations. The operations may include receiving first log data including first information associated with one or more electronic trigger events from a trigger data source. The operations may further include extracting one or more trigger output parameters from a first sentence token of the received first log data and displaying a first set of trigger rules as a first set of user-selectable options onto an electronic User Interface (UI) of a user device based on the extracted one or more trigger output parameters. The operations may further include receiving a first input comprising a selection of one or more trigger rules of the displayed first set of trigger rules and receiving a second input comprising a selection of one or more computer-executable actions to be performed based on whether the first information associated with the one or more electronic trigger events satisfies the one or more trigger rules. The operation may further include generating a computer-executable mashup code for execution on a runtime system (such as the runtime system 108) based on the received first input and the received second input.

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   receiving, from a trigger data source, first log data comprising first information associated with one or more electronic trigger events;
   extracting one or more trigger output parameters from a first sentence token of the received first log data;
   displaying a first set of trigger rules as a first set of user-selectable options onto an electronic User Interface (UI) of a user device based on the extracted one or more trigger output parameters;
   receiving a first input comprising a selection of one or more trigger rules of the displayed first set of trigger rules;
   receiving a second input comprising a selection of one or more computer-executable actions to be performed based on whether the first information associated with the one or more electronic trigger events satisfies the one or more trigger rules;

generating, based on the received first input and the received second input, a computer-executable mashup code for execution on a runtime system;

wherein the computer-executable mashup code comprises:
one or more computer-executable trigger codes,
one or more computer-executable rule codes associated with the one or more trigger rules, and
one or more computer-executable action codes associated with the one or more computer-executable actions;

sending the computer-executable mashup code to the runtime system; and executing the computer-executable mashup code on the runtime system, wherein the execution includes:
executing the one or more computer-executable trigger codes for a) receiving second log data from the trigger data source and b) extracting second information associated with the one or more electronic trigger events;
executing the one or more computer-executable rule codes to generate a trigger response based on a determination that the extracted second information satisfies the one or more trigger rules; and
executing the one or more computer-executable action codes to perform the one or more computer-executable actions.

2. The method according to claim 1, further comprising:
displaying the electronic UI on the user device;
receiving, via the displayed electronic UI, a trigger data source path associated with a source node; and
selecting the trigger data source based on the received trigger data source path.

3. The method according to claim 1, further comprising:
tokenizing the received first log data into a set of sentence tokens;
selecting the first sentence token of the set of sentence tokens;
tokenizing the selected first sentence token into a plurality of word tokens;
determining one or more named entities for one or more word tokens of the plurality of word tokens;
performing part-of-speech (POS) tagging of the plurality of word tokens of the selected first sentence token; and
selecting, from the plurality of word tokens, a first set of word tokens comprising one or more of nouns, noun phrases, or named entities based on the POS tagging and determined one or more named entities.

4. The method according to claim 3, the one or more trigger output parameters comprise the selected first set of word tokens.

5. The method according to claim 3, further comprising selecting, from the selected first sentence token, a first word token based on whether the selected first word token corresponds to a named entity and is included in the selected first set of word tokens.

6. The method according to claim 5, further comprising:
selecting, from the selected first sentence token, a second word token having a dependency of a nominal subject based on a determination that the selected first word token is having a dependency of a direct object (dobj); and extracting the one or more trigger output parameters by extracting the selected second word token from the first sentence token.

7. The method according to claim 5, further comprising:
selecting, from the selected first sentence token, a second word token having a dependency of prepositional modifier (prep) based on a determination that the selected first word token is having a dependency of an object of preposition (pobj); and
extracting the one or more trigger output parameters by extracting the selected second word token from the first sentence token.

8. The method according to claim 1, further comprising:
generating a mashup template based on a trigger data source path associated with the trigger data source, the first input, and the second input,
wherein the generated mashup template comprising a trigger data source path, the first set of trigger rules comprising a trigger criterion, a trigger value, or a trigger output parameter, action parameters for the one or more computer-executable actions; and
generating the computer-executable mashup code further based on the generated mashup template.

9. The method according to claim 1, further comprising subscribing to one or more topics of a message broker as the trigger data source of a data streaming and queuing system,
wherein each topic of the one or more topics corresponding to a type of log data;
receiving, from the message broker, a first message payload associated with a first topic based on the subscription; and
extracting the first log data from the first message payload.

10. The method according to claim 9, further comprising:
receiving, from the message broker, a second message payload associated with the first topic after receiving the first message payload; and
extracting, from the second message payload, second log data based on a determination that the second log data include second information which is different from the first information in the first log data.

11. A non-transitory computer-readable storage medium configured to store instructions that, in response to being executed, causes a system to perform operations, the operations comprising:
receiving, from a trigger data source, first log data comprising first information associated with one or more electronic trigger events;
extracting one or more trigger output parameters from a first sentence token of the received first log data;
displaying a first set of trigger rules as a first set of user-selectable options onto an electronic User Interface (UI) of a user device based on the extracted one or more trigger output parameters;
receiving a first input comprising a selection of one or more trigger rules of the displayed first set of trigger rules;
receiving a second input comprising a selection of one or more computer-executable actions to be performed based on whether the first information associated with the one or more electronic trigger events satisfies the one or more trigger rules;
generating, based on the received first input and the received second input, a computer-executable mashup code for execution on a runtime system;
wherein the computer-executable mashup code comprises:

one or more computer-executable trigger codes,
one or more computer-executable rule codes associated with the one or more trigger rules, and
one or more computer-executable action codes associated with the one or more computer-executable actions;
sending the computer-executable mashup code to the runtime system; and
executing the computer-executable mashup code on the runtime system, wherein the execution includes:
executing the one or more computer-executable trigger codes for a) receiving second log data from the trigger data source and b) extracting second information associated with the one or more electronic trigger events;
executing the one or more computer-executable rule codes to generate a trigger response based on a determination that the extracted second information satisfies the one or more trigger rules; and
executing the one or more computer-executable action codes to perform the one or more computer-executable actions.

12. The non-transitory computer-readable storage medium according to claim 11, wherein the operations further comprises:
displaying the electronic UI on the user device;
receiving, via the displayed electronic UI, a trigger data source path associated with a source node; and
selecting the trigger data source based on the received trigger data source path.

13. The non-transitory computer-readable storage medium according to claim 11, wherein the operations further comprises:
generating a mashup template based on a trigger data source path associated with the trigger data source, the first input, and the second input,
wherein the generated mashup template comprises a trigger data source path, the first set of trigger rules comprising a trigger criterion, a trigger value, or a trigger output parameter, one or more action parameters for the one or more computer-executable actions; and
generating the computer-executable mashup code further based on the generated mashup template.

14. The non-transitory computer-readable storage medium according to claim 11, wherein the operations further comprises subscribing to one or more topics of a message broker as the trigger data source of a data streaming and queuing system,
wherein each topic of the one or more topics corresponding to a type of log data;
receiving, from the message broker, a first message payload associated with a first topic based on the subscription; and
extracting the first log data from the first message payload.

15. The non-transitory computer-readable storage medium according to claim 14, wherein the operations further comprises:
receiving, from the message broker, a second message payload associated with the first topic after receiving the first message payload; and
extracting, from the second message payload, second log data based on a determination that the second log data include second information which is different from the first information in the first log data.

16. A system, comprising:
a processor communicatively coupled to a runtime system, wherein the processor is configured to:
receive, from a trigger data source, first log data comprising first information associated with one or more electronic trigger events;
extract one or more trigger output parameters from a first sentence token of the received first log data;
display a first set of trigger rules as a first set of user-selectable options onto an electronic User Interface (UI) of a user device based on the extracted one or more trigger output parameters;
receive a first input comprising a selection of one or more trigger rules of the displayed first set of trigger rules;
receive a second input comprising a selection of one or more computer-executable actions to be performed based on whether the first information associated with the one or more electronic trigger events satisfies the one or more trigger rules;
generate, based on the received first input and the received second input, a computer-executable mashup code for execution on the runtime system;
wherein the computer-executable mashup code comprises:
one or more computer-executable trigger codes,
one or more computer-executable rule codes associated with the one or more trigger rules, and
one or more computer-executable action codes associated with the one or more computer-executable actions;
send the computer-executable mashup code to the runtime system; and
execute the computer-executable mashup code on the runtime system, wherein the execution includes:
executing the one or more computer-executable trigger codes for a) receiving second log data from the trigger data source and b) extracting second information associated with the one or more electronic trigger events;
executing the one or more computer-executable rule codes to generate a trigger response based on a determination that the extracted second information satisfies the one or more trigger rules; and
executing the one or more computer-executable action codes to perform the one or more computer-executable actions.

* * * * *